(12) United States Patent
Roseborough et al.

(10) Patent No.: US 8,477,136 B2
(45) Date of Patent: Jul. 2, 2013

(54) FUNCTIONAL PRESENTATION LAYER IN A LIGHTWEIGHT CLIENT ARCHITECTURE

(75) Inventors: James Roseborough, Piedmont, CA (US); Ian Farmer, Oakland, CA (US)

(73) Assignee: Mobitv, Inc., Emeryville, CA (US)

( * ) Notice: Subject to any disclaimer, the term of this patent is extended or adjusted under 35 U.S.C. 154(b) by 593 days.

(21) Appl. No.: 12/371,513

(22) Filed: Feb. 13, 2009

(65) Prior Publication Data

US 2010/0207946 A1    Aug. 19, 2010

(51) Int. Cl.
G06T 11/20 (2006.01)
G06T 1/60 (2006.01)
G09G 5/00 (2006.01)

(52) U.S. Cl.
USPC ............ 345/440; 345/418; 345/530; 345/619

(58) Field of Classification Search
USPC .................. 345/440, 419, 473, 522, 619, 418, 345/530, 620, 672
See application file for complete search history.

(56) References Cited

U.S. PATENT DOCUMENTS

| | | | |
|---|---|---|---|
| 2002/0060678 A1* | 5/2002 | Sowizral et al. | 345/420 |
| 2002/0063704 A1* | 5/2002 | Sowizral et al. | 345/419 |
| 2002/0063713 A1* | 5/2002 | Sowizral et al. | 345/440 |
| 2002/0089508 A1* | 7/2002 | Sowizral et al. | 345/522 |
| 2003/0132937 A1* | 7/2003 | Schneider et al. | 345/473 |
| 2004/0189645 A1* | 9/2004 | Beda et al. | 345/473 |
| 2004/0189668 A1* | 9/2004 | Beda et al. | 345/619 |
| 2005/0140694 A1* | 6/2005 | Subramanian et al. | 345/619 |
| 2005/0243090 A1* | 11/2005 | Schneider et al. | 345/440 |
| 2007/0192818 A1* | 8/2007 | Bourges-Sevenier et al. | 725/132 |

* cited by examiner

*Primary Examiner* — Chante Harrison
(74) *Attorney, Agent, or Firm* — Kwan & Olynick LLP (57) ABSTRACT

A device generates an immutable display graph with leaves of the display graph representing low-level graphical operations such as drawings lines or a bitmap and nodes of the display graph representing translation and clipping. Because the display graph is immutable, it can be cached, shared, and rendered quickly. The structure of the display remains fixed, but elements such as rectangle fill, text position, clipping area, translation, and image location, remain time varying and can change without affecting the structure of the display.

20 Claims, 9 Drawing Sheets

FUNCTIONAL PRESENTATION LAYER IN A LIGHTWEIGHT CLIENT ARCHITECTURE

TECHNICAL FIELD

The present disclosure relates to a presentation layer in a lightweight client architecture.

DESCRIPTION OF RELATED ART

A variety of mechanisms are available for generating and rendering user interfaces. Devices with user interfaces need to be able to perform a variety of operations, such as processing user events, presenting graphics and animation, and rendering efficiently. Some existing mechanisms provide multiple threads to handle individual operations and allow for parallel processing. However, using multiple threads requires data sharing and synchronization. Data sharing and synchronization are often sources of software faults and overhead. On devices with limited processing resources, using multiple threads to handle various user interface related operations consumes scarce processing resources.

Consequently, it is desirable to provide improved mechanisms for performing and managing operations associated with presentation layers in a lightweight client architecture.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of mobile devices having limited processing resources. However, it should be noted that the techniques of the present invention apply to a variety of devices. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A device generates an immutable display graph with leaves of the display graph representing low-level graphical operations such as drawings lines or a bitmap and nodes of the display graph representing translation and clipping. Because the display graph is immutable, it can be cached, shared, and rendered quickly. The structure of the display remains fixed, but elements such as rectangle fill, text position, clipping area, translation, and image location, remain time varying and can change without affecting the structure of the display.

Example Embodiments

User interface design on resource limited devices has conventionally required tradeoffs between interface responsiveness, simplicity, and correctness. Interface responsiveness typically requires multithreaded processing, but simplicity and correctness are often lost in an attempt to achieve parallelism. In Java applications, it is common to have multiple threads of execution, where some threads handle the user interface and others execute tasks such as network operations. The threads must share data in order for the user interface to correctly present the application state. Incorrect synchronization of access to shared data is a frequent source of software faults, and synchronization itself is overhead.

Some mechanisms such as OpenGL include mutable display lists, or sequences of rendering operations grouped into a single logical reusable unit. These display lists refer to each other, so re-defining a display list affects the result of rendering any other referencing display list. Other mechanisms such as vector displays used in early computers also used the notion of a display list, typically to contain a sequence of rendering commands that are interpreted by the display portion of the code. Some programming languages also provide for objects that are typically implemented in such a way that adding an element to a set is visible to all users of that set. However, many of these mechanisms can not be used in devices with limited processing power while supporting robust graphical and animation capabilities. Many of these mechanisms also can not support scripting and 3D animation.

Consequently, the techniques and mechanisms of the present invention provide devices with a presentation layer that allows efficient processing of user events, efficient graphics presentation and animation, and effective rendering. Immutable display graphs are provided for efficient caching, rendering, and reuse while allowing for time varying components and animation. A compact and concise set of application program interfaces (APIs). The APIs include simple primitives that can be combined in various ways to achieve arbitrary effects. The APIs include image, rectanglefill, translate, clip, list, glyph, video, and text.

According to various embodiments, user interface display is split into two stages. In the first stage, an immutable display graph is constructed. In particular embodiments, the leaves of the display graph represent low-level graphical operations such as drawing lines or a bitmap and the nodes of the graph represent transformational operations such as translating the coordinate system or clipping. According to various embodiments, the second stage includes rendering the display by walking the display graph. After the display graph is constructed in the first stage, it is not allowed to change. This immutability allows the display graph to be shared by multiple threads.

The runtime system is developed in a way that the construction of a display list can take a relatively long time, but the execution of the corresponding rendering step is relatively quick. According to various embodiments, this allows rapid screen refresh, even for complex scene graphics. Hierarchical relationships between elements can only be established at construction time, and can not be changed once constructed.

However, immutable portions of the display graph can be re-used. Re-use occurs when an element or set of elements appears in more than one screen or widget. Re-use may also occur when an element or set of elements appears multiple times within a single screen or widget. For example, a pop-up window element may be shared by a startup screen and a help screen. The nodes of a display graph may be parameterized at construct time or parameterized using paint variables.

According to various embodiments, a paint variable is a scalar that can take on different values over time. When a paint variable is used in the construction of a node, the value can change between rendering frames. To change the elements that appear on screen, the client layer sets a "root paint op" to some new paint op value. In particular embodiments, any paint op object can act as a root paint op object. Setting the root paint op represents a change of visual appearance for the client and guarantees that the complete scene is ready for rendering.

A function exists for setting the value of one or more paint variables. The values can be set to either new scalar values, or an implied function of time expressed as a spline curve, or optionally a completely arbitrary function of time via a scripted closure, or some other mechanism. In particular embodiments, when multiple variables are set to new values within a single function call, the values take place at the beginning of the next rendering frame.

According to various embodiments, rendering occurs whenever an animated element is already on screen but not yet done animating, a paint variable's value has been changed, or the root paint operation has been changed. In particular embodiments, the implementation controls the rate of reanimating when animations are present, and the wall clock time is used to determine the animation location for each animated frame. The animation time is set at the beginning of each animation cycle and maintained throughout the cycle so that animated elements are synchronized to the same clock easily.

According to various embodiments, the generality and immutability of the display graph provide significant benefits including flexibility and high performance. Because the leaves of the display graph represent general-purpose, low-level operations, the code that produces the display graph has control over the look and feel of the application. The code may be written in a scripting language and delivered to the client over a wireless network. The display graph is immutable so that sub-trees can be cached and re-used after they are produced, which lessens the amount of time the application spends on display layout.

The scripted portion of the application can focus only on the logical elements that need to be displayed. According to various embodiments, the system prevents creation of scene graphs that contain cycles and guarantees thread safety of the objects used in rendering. In particular embodiments, the system guarantees that it will never display only a portion of the scene. Once a root paint op is set, the entire scene is ready for rendering, and cannot be put into an intermediate state that can not be rendered. Since portions of the scene graph can be saved, and re-used, portions of the scene that do not change can be left alone, while portions that are changing can be regenerated. Thus there can be efficient use of memory and cache.

In particular embodiments, the system can be implemented on a variety of platforms including J2ME, J2SE, Brew, Windows, and SDL rendering API's. Because animation can be done using the paint variables, the client code does not need to concern itself with exact timing of rendering messages, etc. The same source code can produce a result which is adapted to client hardware. For example, if a complex animation is being attempted on a slower device, the frame rate will slow down, but the animation will transition into a terminal state in roughly the same time, because the wall clock time is driving the position of each animated frame.

According to various embodiments, it becomes efficient to create animation that includes multiple synchronized parts because the animation time is guaranteed to be the same for all elements that are on screen.

Figure 1:
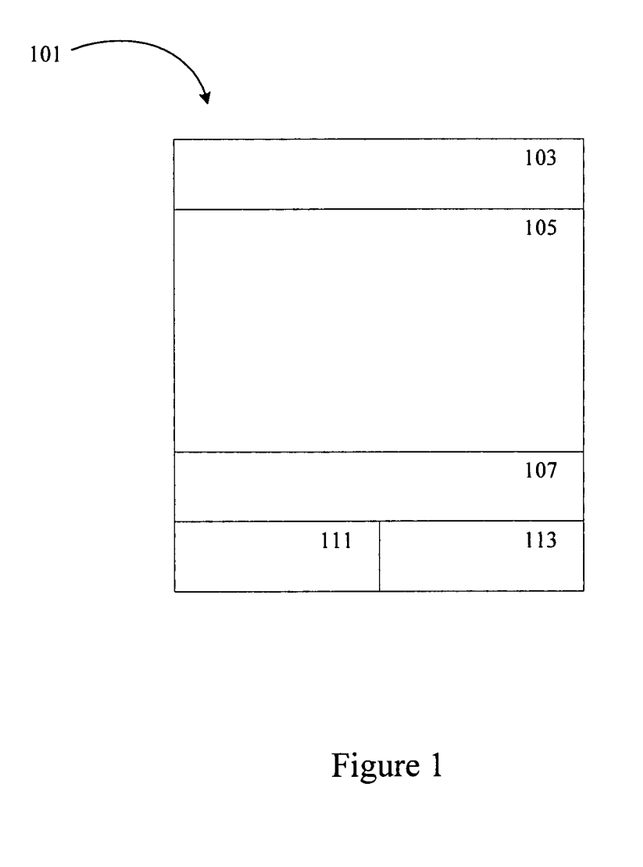
FIG. 1 illustrates one example of a display graph having immutable structure with time varying components.

FIG. 1 illustrates one example of a display graph having immutable components. According to various embodiments, a user interface display includes immutable portions such as 103, 105, 111, and 113. In particular embodiments, the leaves of the display graph represent low-level graphical operations such as drawing lines or a bitmap and the nodes of the graph represent operations such as translating the coordinate system or clipping. The display is rendered by walking the display graph. The immutable portions may be rendered by walking the display graph. After the display graph is constructed, it is not allowed to change. This immutability allows the display graph to be shared by multiple threads, multiple functions in an application, or multiple applications.

It is recognized that construction of a display list can take a relatively long time, but the execution of the corresponding rendering step is relatively quick. According to various embodiments, quick execution allows rapid screen refresh, even for complex scene graphics. Hierarchical relationships between elements can only be established at construction time, and can not be changed once constructed. Immutable portions 103, 105, 111, and 113 can be re-used. Re-use occurs when an element of set of elements appears in more than one screen or widget or when an element or set of elements appears multiple times within a single screen or widget. For example, a pop-up window element may be shared by a startup screen and a help screen. The nodes of a display graph may be parameterized at construct time or parameterized using paint variables.

Figure 2:
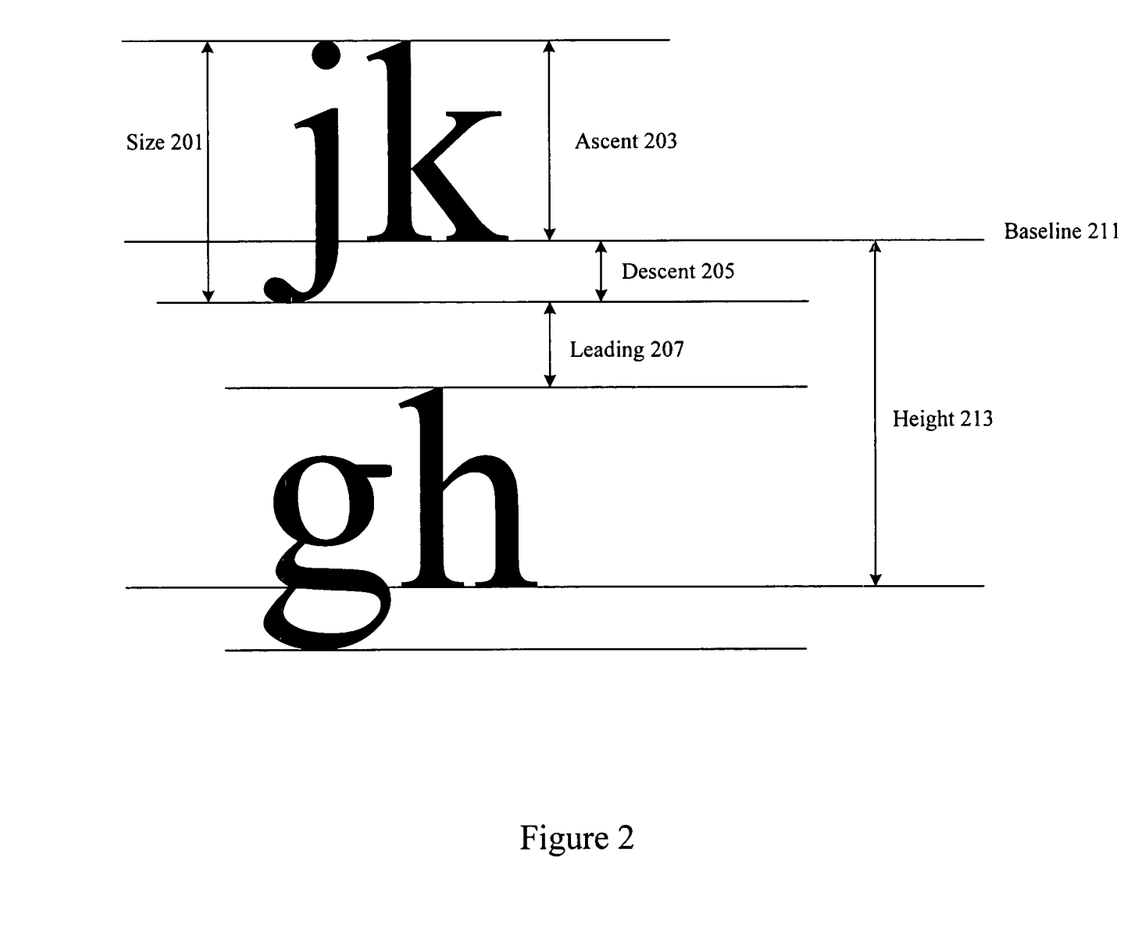
FIG. 2 illustrates one example of font characteristics for rendering text.

According to various embodiments, a paint variable is a scalar that can take on different values over time. In one example, portion 107 includes a marquee. When a paint variable is used in the construction of a node, the value can change between rendering frames. To change the elements that appear on screen, the client layer sets a "root paint op" to some new paint op value. In particular embodiments, any paint op can act as a root paint op. Setting the root paint op represents a change of visual appearance for the client and guarantees that the complete scene is ready for rendering. In some examples, text is run continuously as a banner or ticker in portion 107. As noted, paint ops are immutable once created and are cached insofar as possible to allow for efficient rendering. According to various embodiments, a wide variety of application program interfaces can be used to perform graphics operations. In particular embodiments, paint operations may be used to place video on a screen. Some paint operations may include the following:

paint.buffer(width, height)—creates a paint buffer where width denotes a number containing the width of the buffer and height denotes a number containing the height of the buffer.

paint.clip (op, x, y [, width, height])—clips a paint op where op denotes a paint op to clip, x is a non-negative number containing the clip rectangle's left edge, y is a non-negative number containing the clip rectangle top edge, width is a non-negative number containing the width of the clipped paint op, and height is a non-negative number containing the height of the clipped paint op.

paint.counter([screenId]): complete, started—provides access to the number of display paint operations wherein screenId is a number containing a screen identifier. This operation returns either complete indicating the number of times the display has been painted or started containing the number of repaints that have started.

paint.fill(color [, x, y [, w, h]])—creates a paint op that fills a rectangular area with any color, where color is a 24-bit color, x contains the position of the fill's left edge, y contains the position of the fill's top edge, w is a non-negative number containing the fill's width, and h is a non-negative number containing the fill's height.

paint.font(name, color, size [, style]): font, height, ascent, descent—creates a font for rendering text. FIG. 2 illustrates parameters associated with rendering font. Name contains the name of the font family. Color represents a 24-bit RGB color. Size denotes a number containing the size of the font. Style specifies font style such as italic, bold, or plain. The operation returns a new font object with a height 213 denoting the height of the font for line spacing from a baseline 211, ascent 203 denoting the nominal ascent value for the font, descent 205 containing the nominal descent value for the font, leading 207 denoting the difference between height and size, size 201 denoting that sum of the ascent and the descent. It should be noted that one or more values may or may not be returned or derived from other values.

The returned font can be measured or rendered.

font:measure(text)—measures the width of a text string when rendered and returns the width in pixels.

font:text(text [, x, y])—renders text using a font, where text is a string containing text to render, x denotes the horizontal screen position of the left edge of the baseline 211, and y denotes the vertical screen position of the baseline 211.

paint.getvars(var1 [, var2 [ . . . ]]):value1 [, value2 [ . . . ]]—gets a collection of paint parameters in an atomic way where all the values will be associated with the same rendering timestamp, independent of any threading state of the underlying implementation. Var1 and var2 represent parameters to be set and value1 and value 2 represent values for a particular rendering cycle.

paint.glyph(op, xclip, yclip, xdest, ydest [, wclip, hclip, xadvance, yadvance])—translates and clips a paint op where op denotes a paint op to translate and clip, xclip denotes the position of the left edge of the clipping rectangle relative to the paint op's left edge, yclip denotes the position of the top edge of the clipping rectangle, relative to the paint op's top edge, xdest denotes the position of the left edge of the translated paint op relative to the original, ydest denotes the position of the top edge of the translated paint op relative to the origin, wclip denotes the width of the clip region, hclip denotes the height of the clipping region, xadvance denotes the horizontal translation value, and yadvance denotes the vertical translation value.

paintimage(img [, x, y]): op, width, height—creates a paint op containing an image, where img is an object containing encoded image bytes, x denotes the screen position of the left edge of the image when rendered, y denotes the top edge of the image when rendered, op is a new paint op object for the object, width provides the image width, and height provides the image height.

paint.list(op, . . . )—creates a list of paint ops to be rendered in order, where op is a list of one or more exiting paint op objects. A new paint op representing a list of existing paint ops is returned.

paint.render (buffer, op)—renders a paint operation to a paint buffer, where buffer is a paint buffer and op is the paint op object to be rendered.

paint.setroot (op)—paints a paint op to the screen, where op is the paint op to be rendered on the screen.

paint.toimage (buffer)—creates an image from a paint buffer where buffer contains the image data.

paint.text (font, text, x, y)—renders text using a font, where font denotes the character type with which to render the text, text is a string to render, x denotes the horizontal screen position of the left edge of the baseline 211, y denotes the vertical screen position of the baseline 211. This operation returns a new paint op object.

paint.trans (op, x [,y])—translates a paint op to a new location, where op refers to the paint op, x is the horizontal offset, and y is the vertical offset.

paint.var (var)—creates a paint var object for use as an argument to a paint op, where value denotes the initial value of the paint var.

paint.video (x, y, width, height)—creates a paint op into which video will play, where x denotes the position of the left edge of the video paint op, y denotes the position of the top edge, width is a non-negative number denoting the width, and height is a non-negative number denoting the height.

paint.setvars (var1, value1[, var2, value2 [ . . . ]])—sets a collection of paint parameters in an atomic way, where all values will be for the same rendering timestep, independent of any threading state of the underlying implementation. The parameters var1 and var2 denote paint variables to be set. Value1 and value 2 denote either a number or a string containing a spline value noted below.

According to various embodiments, spline values are of the form {[loop=true,][cve1=true,][dt1,[x1b,]x1a,]x1]],[dt2, [x2b,]x2a,]x2][ . . . ]], which can be of a time delta dti and a list of 1, 2, or 3 bezier control points xi, xia, and xib depending on the degree of interpolation. For the common case of a single-segment spline, a short-form is allowed: {dt1, [namedoptions] [[x1b,] x1a,] x1}. In particular embodiments, the valid named options are loop=count, where count is one of {1, 2, . . . } or true to loop forever and cve1=true for constant velocity blending with a previous state.

TABLE 1

| Name | Table | Description | Situation |
| --- | --- | --- | --- |
| Linear Movement | {500, 100} | Move with constant velocity to value = 100 in 500 msec | Exactly linear motion |
| Deceleration | {500, 100, 100} | Move to value = 100 in 500 msec, decel at end | Simple deceleration effect |
| Quadratic decel | {500, 100, 100, 100} | Move to value = 100 in 500 msec, decel with quadratic curve | Pronounced deceleration effect |
| Overshoot | {2000, 150, 100, 100} | Move to value = 100 in 2000 msec, overshoot first then fall back | Overshoot effect |
| Bounce | {{700, 200, 100}, {0, 100}, {500, 150, 100}} | Bounce once on way to goal of 100 in 1200 msec total | Single-bounce effect |
| Linear looping | {500, 100, loop = true} | Loop forever with constant velocity to value = 100 every 500 msec | Marquees |
| Velocity blending | {500, 100, 100, 100, cvel = true} | Velocity blending, then quadratic decay | Typical blend and decay effect |

Figure 3:
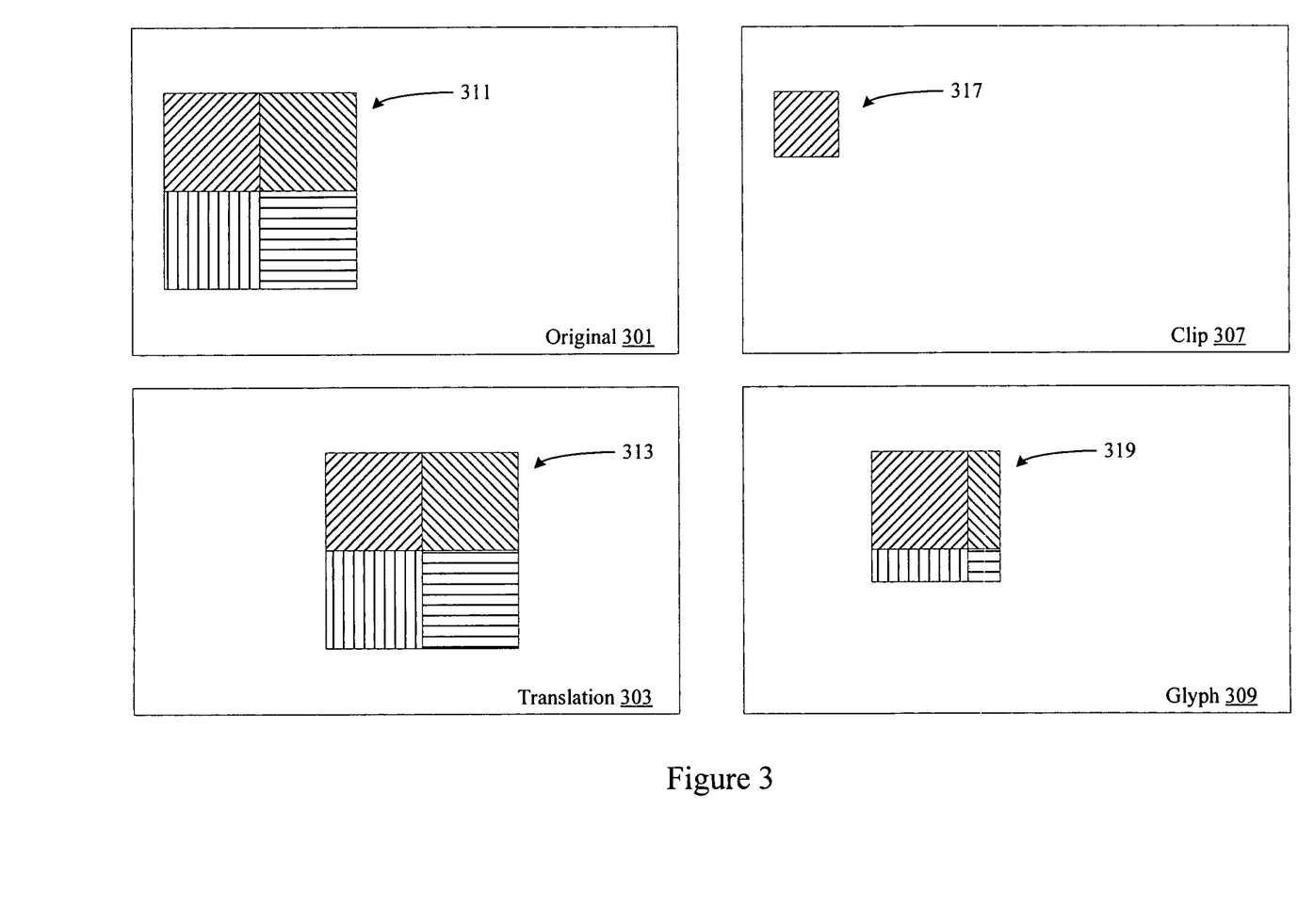
FIG. 3 illustrates examples of translation, clip, and glyph.

FIG. 3 illustrates examples of translation, clip, and glyph. An original paint op 311 resides in original state 301. In translation state 303, the paint op 313 may be moved using the following operation: trans(original, 25, 25). In the clip state 307, the paint op 317 results from the following operation: clip (trans(original, 25, 25), 5, 5, 30, 30). In the glyph state 309, the paint op 319 results after the operation glyph (original, 25, 25, 5, 5, 30, 30).

Figure 4:
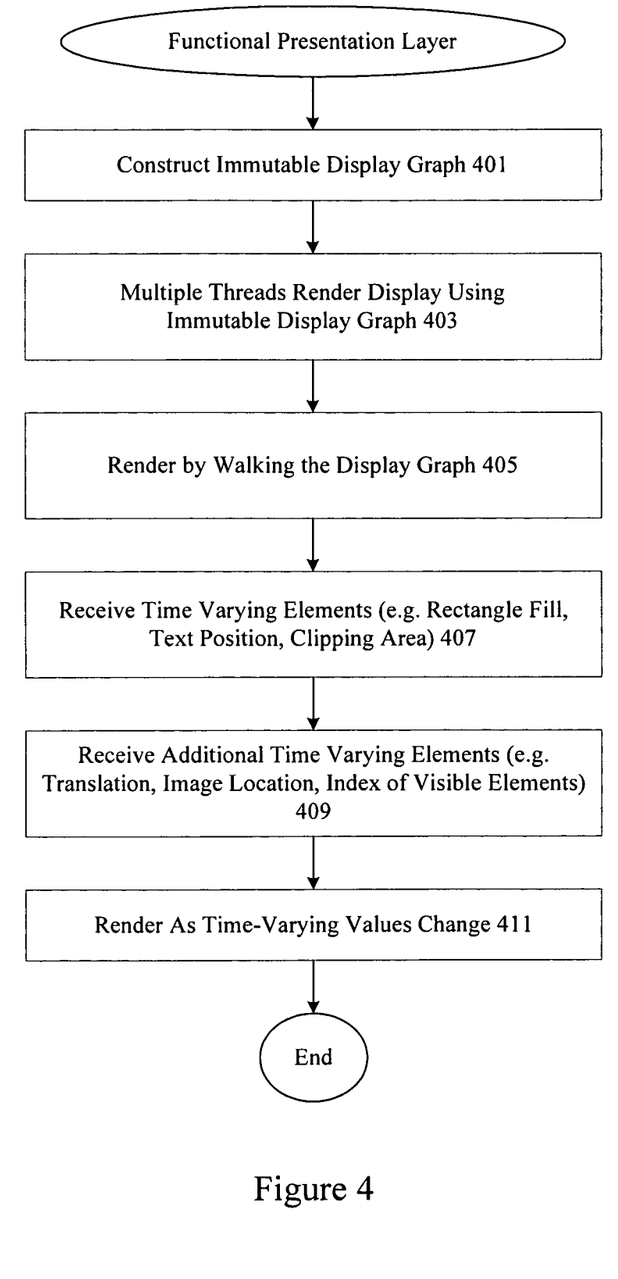
FIG. 4 illustrates a particular example of presenting and rendering a user interface.

FIG. 4 illustrates one example of a technique for providing a presentation layer in processing constrained devices. At 401, an immutable display graph is constructed. According to various embodiments, the leaves of the display graph represent low-level graphical operations such as drawing lines or a bitmap and the nodes of the graph represent operations such as translating the coordinate system or clipping. At 403, multiple threads can reuse and render the display using the immutable display graph. In particular embodiments, the different threads may operate in different portions of an application or different applications entirely. At 405, the display is rendered by walking the display graph. At 407, time varying elements are received. In particular embodiments, time varying elements may include rectangle fill, text position, clipping area. Additional time varying elements such as translation, image location, index of visible elements, may also be received at 409. According to various embodiments, the display is rendered as time-varying values change at 411. The display graph itself, however, remains immutable.

Figure 5:
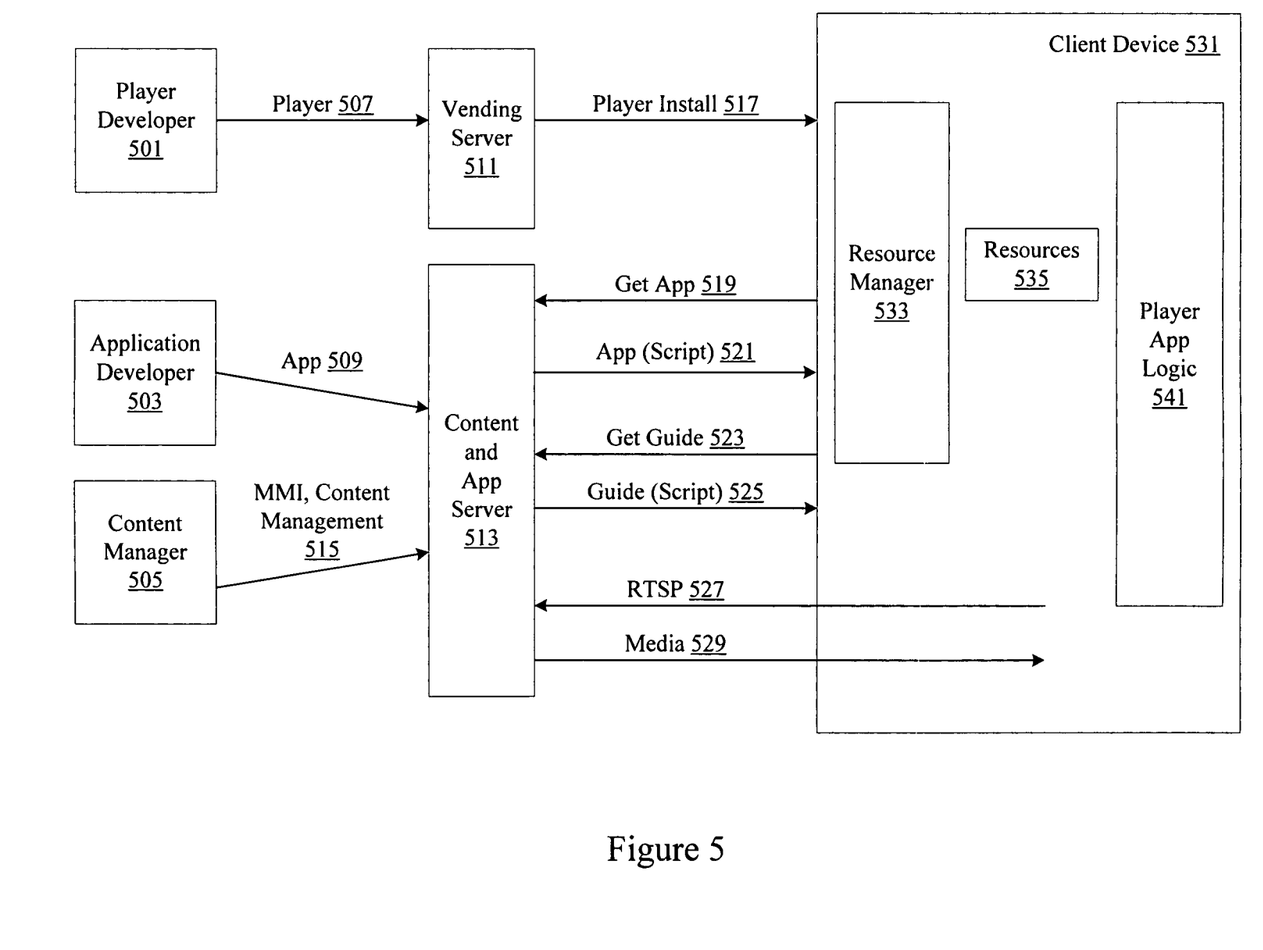
FIG. 5 illustrates an architecture for providing and managing application logic on a reprogrammable client using uniform bytecode.

FIG. 5 illustrates one example of providing and managing applications on a client device using bytecode. According to various embodiments, a player developer 501 provides a player 507 such as a media player 507 to a vending server 511. In particular embodiments, the player 507 does not need to be provided in finalized form. According to various embodiments, the player merely includes working platform application program interface (API) logic. In particular embodiments, a library of paint op APIs is provided as part of the player. The player is installed at 517 on the underlying native platform of the client device 531. According to various embodiments, the underlying native platform operates using Java or C. The client device no longer has to be installed with an essentially finalized version of application flow logic, system call logic, application flow logic, business logic, and user interface logic. Player application logic 541 is essentially fixed, but is provided as a thinnest possible layer of logic connected to resources 535 and resource manager 533.

Application developers 503 provide application logic 509 to content and application server 513. Content manager 505 provides content management information 515 to content and application server 513. According to various embodiments, the client device 531 issues requests such as a get application request 519 to obtain applications 521 from the content and application server 513. According to various embodiments, applications 521 are provided using bytecode after the content and application server receives the player request 519 and determines which application to send to the client device 531. In some embodiments, the content and application server 513 sends application 521 to the client device 531 in portions. According to various embodiments, the content and application server 513 also tracks the version of the installed application on a per user and per platform basis. Applications and application portions are provided using bytecode.

Guide data 525 may also be provided in response to a get guide 523 request. In particular embodiments, all client device 531 requests include a player user identifier. The player user identifier is typically assigned by a content and application server when the client device 531 does not provide one in its requests. In particular embodiments, if the client does not yet have a player user identifier, it persists the one it receives from the content and application server. In other embodiments, the vending server provides a player user identifier to the client device 531 when the player is installed at 517. In still other embodiments, the player user identifier is derived from other identifiers that the network may already provide about the player, the device it is running on, the user account, or any suitable user information. In particular embodiments, an RTSP request 527 is sent to the content and application server 513 to retrieve media 529.

According to various embodiments, the client device 531 has a bytecode interpreter that processes the bytecode, whether the bytecode represents application logic that provides highly tailored application experiences to a user, system calls that direct the client device 531 to present a page or navigate a page, or messaging data such as guide data 525 provided as a table of data wrapped in bytecode. In particular embodiments, executing bytecode produces deserialized objects that are presented as Lua data structures. The bytecode may pass a table of guide data, subscription information, authentication tokens, user properties, management data, etc. The user can be pass data back to the server using bytecode if the client has a compiler, or the user may pass data back to the server using plain text.

The player 507 can be shipped with a limited feature set while still allowing flexibility in expanding, updating, and enhancing client applications. The client can be made extremely thin, as only a byte-code interpreter is required. No parsing or compiling is required. It is acknowledged that there is more processing required at the content and application server, but less processing is required at the client device 531.

According to various embodiments, the player 507 uses a common protocol to communicate and receive applications appropriate for the underlying platform and associated end-user subscriptions. The player 507 may be developed and installed independently of the application, which includes commands run on the player.

Figure 6:
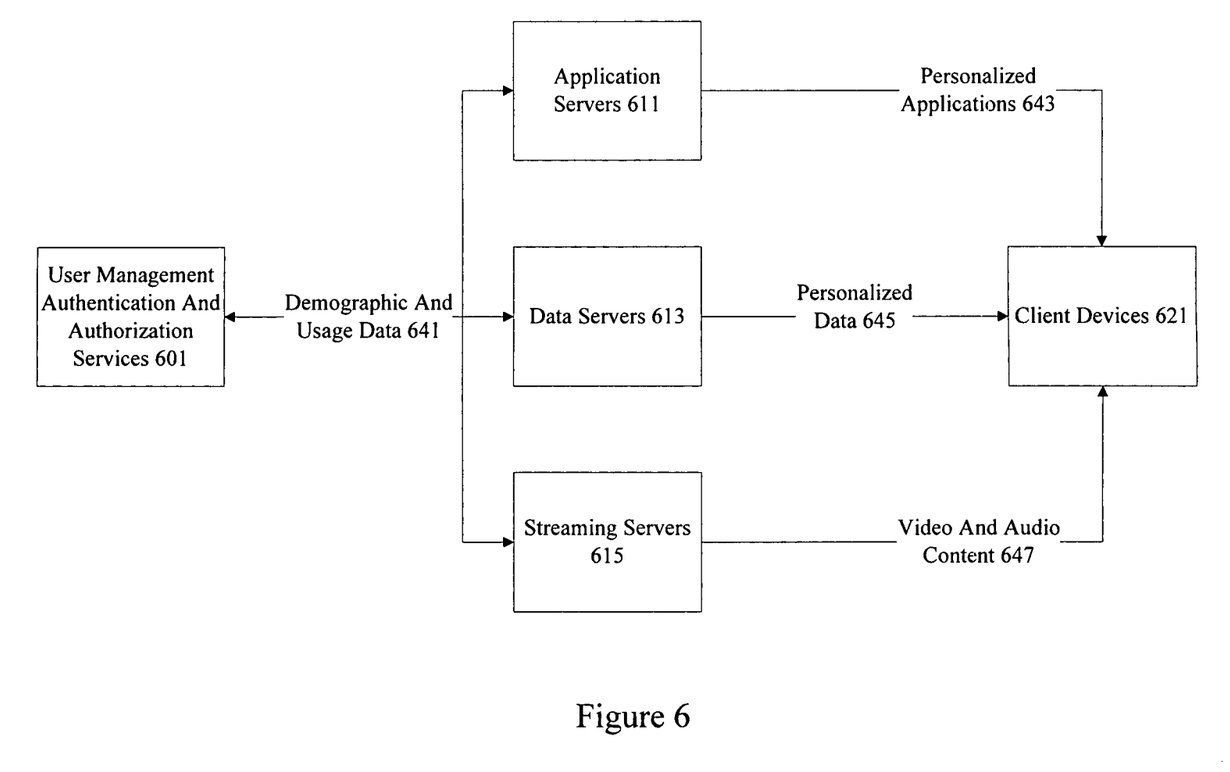
FIG. 6 illustrates one example of a client side interpreter platform.

The techniques and mechanisms of the present invention can be implemented in a variety of systems. FIG. 6 illustrates one example of a system that includes mobile devices. According to various embodiments, a client side interpreter platform includes client components and server components. Server components include applications servers 611, data servers 613, and streaming server 615. In particular embodiments, the server operate to deploy, maintain, and update client side interpreter applications. In some examples, user management, authentication, and authorization services are provided along with the ability to integrate with service provider facilities. Application servers 611 provide personalized application 643 to client devices 621 such as mobile devices. According to various embodiments, the application servers 611 provide application updates. Carriers can easily upgrade, modify, or personalize client applications for delivery to end users or groups of end users based on usage patterns, geographical location, user preferences, subscription type, and device capabilities.

Data servers 613 provide personalized data 645 to client devices 621. In particular embodiments, the data servers 613 manage channel guides and personalized data for individual users. Demographic and usage data 641 is shared with user management authentication and authorization services 601 to provide a personalized user experience based on a user's subscriptions, geographical location, preferences, and device capabilities. Streaming servers 615 provide video and audio content 647 to client devices 621. According to various embodiments, the streaming servers 615 deliver audio and video content to clients. Content can include live television, video on demand (VoD), user generated, and audio.

According to various embodiments, the client side interpreter platform allows rapid development and deployment of applications across a broad range of devices for a variety of users. Applications can be ported to emerging handset and desktop environments efficiently while providing a personalized user experience. Seamless over the air (OTA) upgrades are supported for a number of flexible applications. In particular embodiments, the client side interpreter platform simplifies and streamlines the development process and offers flexibility for updating, modifying, and personalizing applications. It supports separate development of client players and applications, allowing carriers to update and redeploy applications as often as necessary.

In particular embodiments, mobile applications generally fall into two categories: applications that provide access to mobile browser (WAP) pages and custom applications built for each device. The browser pages work on all devices and can be updated at any time, but they provide a poor user experience. Custom applications provide a better user experience but are costly, slow to develop, difficult to deploy, and hard to upgrade.

The client side interpreter platform provides a lightweight standard scripting engine that can be quickly ported to any mobile device. Only the engine is ported, not the entire application. Developing this way is faster and more reliable, because the engine is significantly less complex than the entire application, and once it is ported, it can be reused for many different applications and version upgrades.

The client side interpreter application can be updated on the server at any time. The client side interpreter engine queries the server for the latest rules regarding mandatory and optional upgrades and available versions of the application. To end users, however, the application appears to be custom made for their individual devices, with all available enhanced graphics and user interfaces Developers can add, change, or remove features at any time. For example, a one time promotional feature could appear only during the promotion time frame without being tied to the handset release. Customization based on user, device, location, time, or any number of options is possible. The client side interpreter platform provides a new level of dynamic custom application creation and distribution.

In the competitive mobile marketplace, service providers face increasing pressure to rapidly develop, test and deploy client applications. By decoupling player and application development, the client side interpreter interpreted allows rapid development of lightweight, scripted applications on short development cycles. The player and application development can proceed in parallel, greatly reducing time to market. The client side interpreter also provides tremendous flexibility in how applications are made available to subscribers. For example, applications may be made available through preloads, vended applications, and OTA upgrades.

Figure 7:
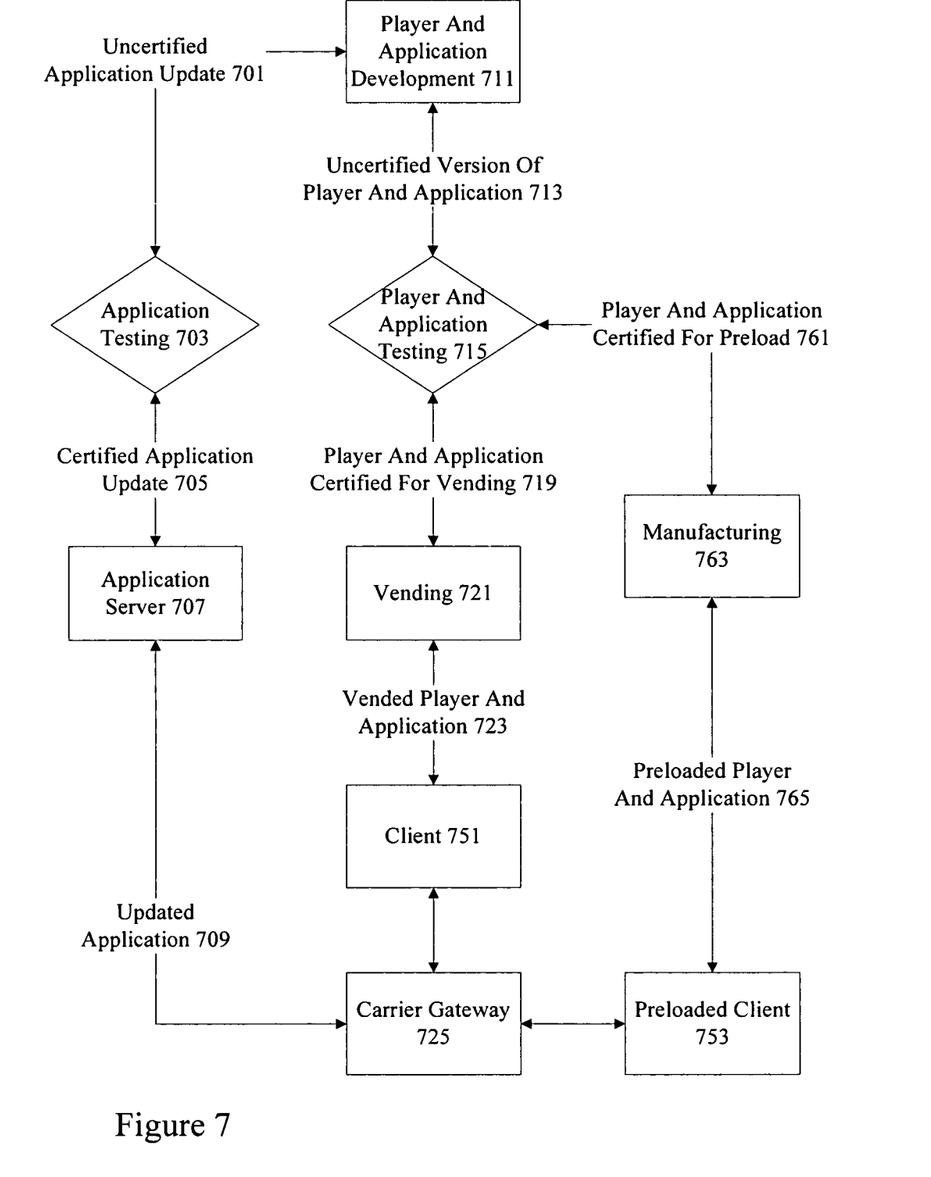
FIG. 7 illustrates examples of client side interpreter application development, testing, and vending mechanisms.

FIG. 7 illustrates mechanisms for development, testing, and vending processes. According to various embodiments, a client side interpreter application can be provided on a client device in a variety of manners. According to various embodiments, device manufacturers can preload the client side interpreter player and application during the manufacturing process. Player and application development 711 provides an uncertified version of the player and application 713 to player and application testing 715. Once a player and application is certified for preload at 761, they are provided to manufacturing 763. Manufacturing provided a preloaded player and application 765 onto a preloaded client 753 such as a preloaded mobile device.

OTA upgrades are also supported. According to various embodiments, once the client side interpreter player is on the client device, carriers can update the application OTA as often as necessary and in as targeted a manner as necessary. For example, they can provide different applications to different user groups. In particular embodiments, an uncertified application update 701 may be provided for application testing 703. The certificated application update 705 is provided to an application server 707. The updated application 709 is provided to a carrier gateway 725 that can send the updated application 709 to client devices 751 and 753 OTA.

If the client side interpreter player is not preloaded on a device or provided OTA, carriers may make the client side interpreter player and applications available through their vending services. They also may support applications vended through third parties. According to various embodiments, a player and application certified for vending 719 is provided to vending component 721. The vended player and application 723 is provided to a client 751. As often as necessary, carriers can provide end users with updated versions of the client application OTA through an application delivery server. Application updates require no changes to the client player.

Figure 8:
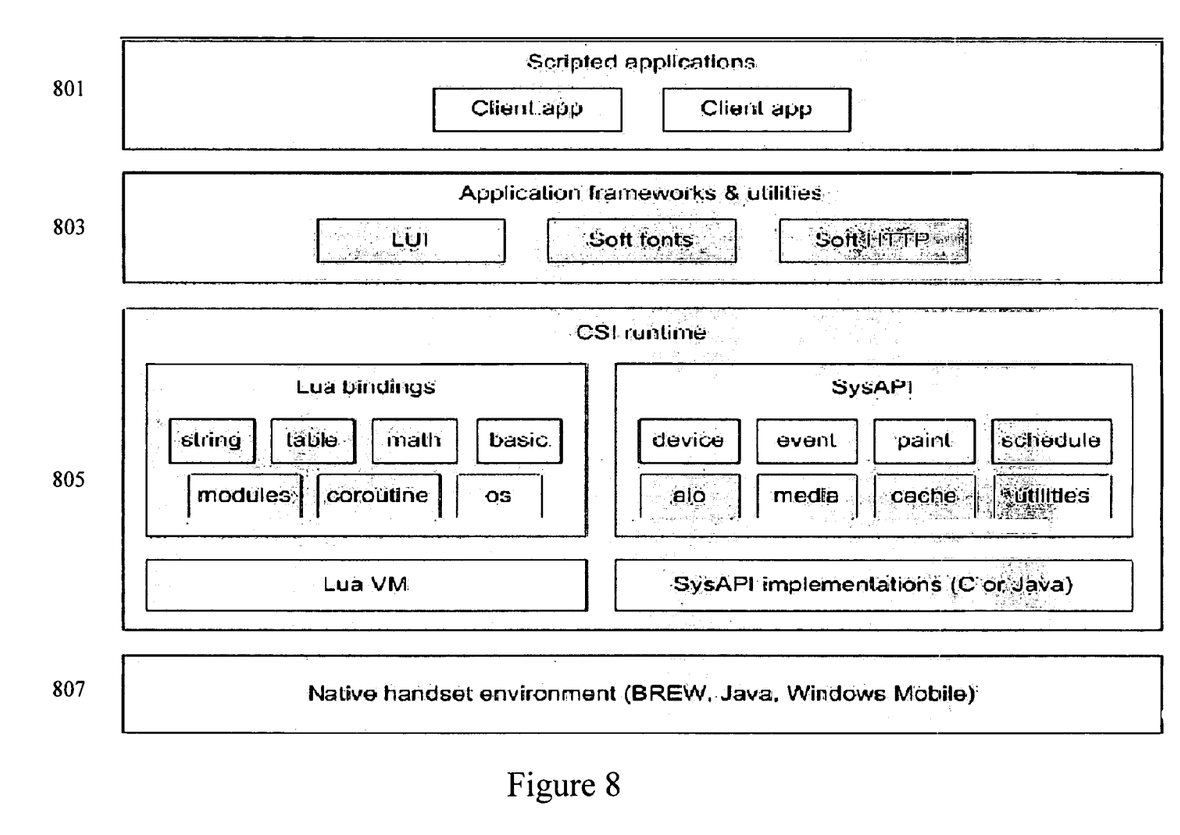
FIG. 8 illustrates one example of a client side interpreter architecture.

FIG. 8 shows an overview of the client side interpreter client architecture. According to various embodiments, client side interpreter applications are built on several layers including a scripted applications layer 801, an application frameworks and utilities layer 803, a runtime layer 805, and a native handset environment layer 807. According to various embodiments, the client side interpreter supports the native handset environments Sun Java™, QUALCOMM® BREW™, and Microsoft® Windows Mobile®, which are recognized as not sufficiently supporting cross-platform portability and re-use. Consequently, the client side interpreter platform incorporates support for each of the above noted handset environments. According to various embodiments, the client side interpreter platform runs on any existing mobile device platform.

According to various embodiments, applications layer 801 includes scripted client applications. Scripted applications can access either the application frameworks or the client side interpreter runtime. Applications are written in Lua, a lightweight and expressive language. Layer 803 includes frameworks and utilities such as soft fonts, soft HTTP, LUI, etc. The soft fonts and soft HTTP utilities allow applications to use fonts or HTTP that work the same way on any handset. These provide an alternative to native fonts or HTTP. Application frameworks and utilities 803 allow a high degree of control over the user interface. The client side interpreter layer 805 includes a virtual machine, implementations, bindings, and utilities that make up the client side interpreter player. According to various embodiments, a Lua virtual machine is a client interpreter for the Lua programming language. In particular embodiments, the Lua virtual machine runs on top of other virtual machines. It runs on Java, BREW, and Windows Mobile and provides full Lua language support. The SysAPI implementations include bindings in the SysAPI. The SysAPI implementations are tuned to perform optimally on each individual device that the service supports.

In particular embodiments, the SysAPI is a common interface to generic mobile device capabilities, including screen paint operations, media playback, and network IO. Developers can write code in Lua to interact with the SysAPI. The Lua bindings provide basic Lua functions, including string, table, math, basic, modules, coroutine, and os. According to various embodiments, the Lua user interface (LUI) is a declarative UI framework that provides navigation, screen flow, and basic UI widgets. It provides a high degree of correspondence between UI specifications and code that implements them.

An over the air update function is included in the client side interpreter player and requests the client application code from the application server. Client side interpreter applications implement specific application behaviors, including authenticating the user, requesting programming guide data and related graphics, screen painting operations, responding to user input, and requesting media streams from a streaming server.

Figure 9:
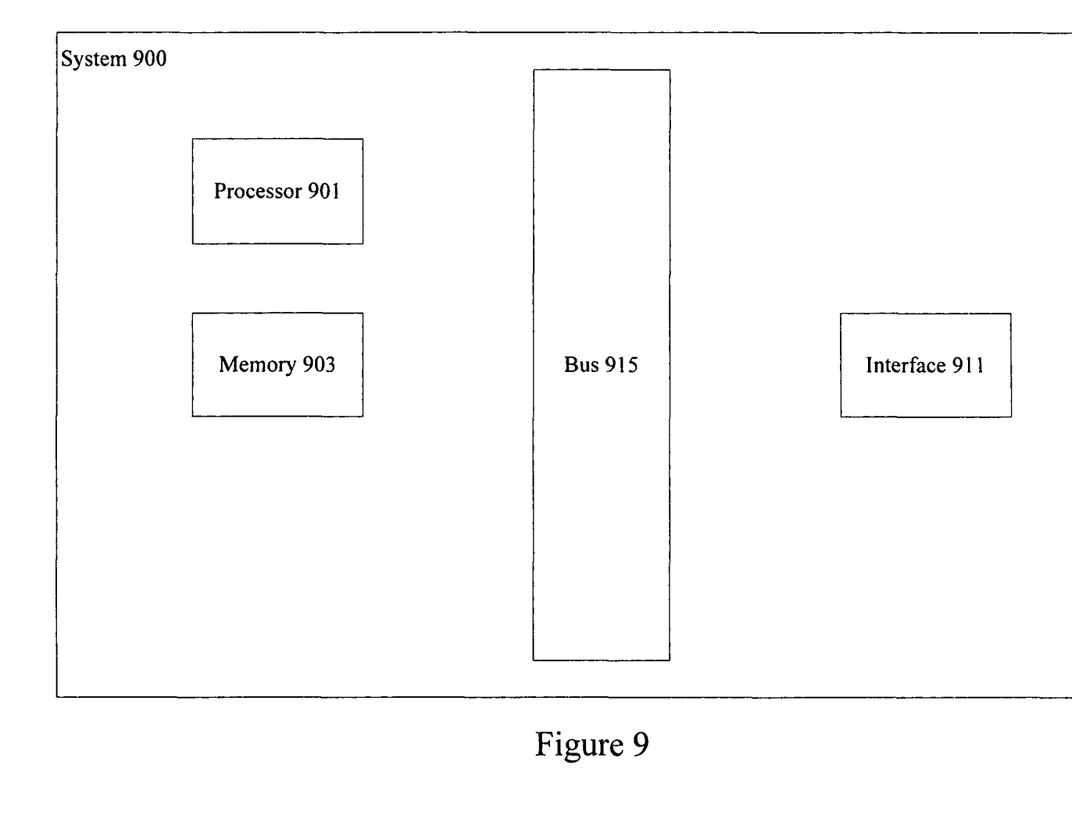
FIG. 9 illustrates one example of a server.

FIG. 9 illustrates one example of a server that can be used as an applications server, data server, or streaming server. According to particular embodiments, a system 900 suitable for implementing particular embodiments of the present invention includes a processor 901, a memory 903, an interface 911, and a bus 915 (e.g., a PCI bus or other interconnection fabric) and operates as a streaming server. When acting under the control of appropriate software or firmware, the processor 901 is responsible for modifying and transmitting live media data to a client. Various specially configured devices can also be used in place of a processor 901 or in addition to processor 901. The interface 911 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 900 is a content server that also includes a transceiver, streaming buffers, and a program guide database. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 991 handles requests and responses for media content related transactions while a separate streaming server provides the actual media streams.

Although a particular content server 991 is described, it should be recognized that a variety of alternative configurations are possible. For example, some modules such as a report and logging module 953 and a monitor 951 may not be needed on every server. Alternatively, the modules may be implemented on another device connected to the server. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
generating an immutable display graph, wherein the immutable display graph is shared by a plurality of threads in an application running on a device, wherein the immutable display graph is cached and shared by the plurality of threads in the application when an element appears multiple times in the same application, wherein leaves of the immutable display graph represent low-level graphical operations including drawings lines and wherein nodes of the immutable display graph represent transformational operations including translation and clipping;
rendering a display using the immutable display graph, wherein the display is a user interface display, wherein partial display of the immutable display graph is prevented once a root paint op is set, wherein a client layer sets the root paint op which represents a change of visual appearance and guarantees that a complete scene is ready for rendering;
receiving a time varying element associated with the immutable display graph;

rendering the time varying element as a paint variable associated with time varying element changes.

2. The method of claim 1, wherein the time varying element comprises rectangle fill, text position, and clipping area.

3. The method of claim 1, wherein the time varying elements comprises translation, image location, and an index of visible elements.

4. The method of claim 1, wherein leaves of the immutable display graph represent low-level graphical operations including drawings lines.

5. The method of claim 1, wherein leaves of the immutable display graph represent low-level graphical operations including drawing a bitmap.

6. The method of claim 1, wherein nodes of the immutable display graph represent transformational operations including translation and clipping.

7. The method of claim 1, wherein the display is rendered by walking the immutable display graph.

8. The method of claim 1, wherein the plurality of threads operate in different portions of the application.

9. The method of claim 1, wherein the plurality of threads operate in different applications.

10. A device, comprising:
    a processor operable to generate an immutable display graph shared by a plurality of threads in an application running on the device running on a device, wherein the immutable display graph is cached and shared by the plurality of threads in the application when an element appears multiple times in the same application, wherein leaves of the immutable display graph represent low-level graphical operations including drawings lines and wherein nodes of the immutable display graph represent transformational operations including translation and clipping, wherein the processor is further operable to render a display using the immutable display graph, wherein the display is a user interface display, wherein partial display of the immutable display graph is prevented once a root paint op is set, wherein a client layer sets the root paint op which represents a change of visual appearance and guarantees that a complete scene is ready for rendering;
    an interface operable to receive a time varying element associated with the immutable display graph;
    wherein the processor is further operable to render the time varying element as a paint variable associated with time varying element changes.

11. The device of claim 10, wherein the time varying element comprises rectangle fill, text position, and clipping area.

12. The device of claim 10, wherein the time varying elements comprises translation, image location, and an index of visible elements.

13. The device of claim 10, wherein leaves of the immutable display graph represent low-level graphical operations including drawings lines.

14. The device of claim 10, wherein leaves of the immutable display graph represent low-level graphical operations including drawing a bitmap.

15. The device of claim 10, wherein nodes of the immutable display graph represent transformational operations including translation and clipping.

16. The device of claim 10, wherein the display is rendered by walking the immutable display graph.

17. The device of claim 10, wherein the plurality of threads operate in different portions of the application.

18. The device of claim 10, wherein the plurality of threads operate in different applications.

19. A non-transitory computer readable medium, comprising:
    computer code for generating an immutable display graph, wherein the immutable display graph is shared by a plurality of threads in an application running on a device, wherein the immutable display graph is cached and shared by the plurality of threads in the application when an element appears multiple times in the same application, wherein leaves of the immutable display graph represent low-level graphical operations including drawings lines and wherein nodes of the immutable display graph represent transformational operations including translation and clipping;
    computer code for rendering a display using the immutable display graph, wherein the display is a user interface display, wherein partial display of the immutable display graph is prevented once a root paint op is set, wherein a client layer sets the root paint op which represents a change of visual appearance and guarantees that a complete scene is ready for rendering;
    computer code for receiving a time varying element associated with the immutable display graph;
    computer code for rendering the time varying element as a paint variable associated with time varying element changes.

20. The non-transitory computer readable medium of claim 19, wherein the time varying element comprises rectangle fill, text position, and clipping area.

* * * * *